Patented Mar. 13, 1928.

1,662,625

UNITED STATES PATENT OFFICE.

LIEBESKIND WILLIAMS, OF PHILADELPHIA, PENNSYLVANIA.

COMPOSITION OF MATTER.

No Drawing.     Application filed May 7, 1927.   Serial No. 189,746.

My invention relates to a new and useful composition of matter and more particularly to a new and useful white pigment which is adapted for use as a paint alike on wooden, metallic or other surfaces, polished or otherwise, and which produces a permanent, sanitary and economical paint.

It has been the general practice heretofore to employ lead carbonate, commonly known as white lead for a pigment. As is well known, white lead turns black when it comes in contact with hydrogen sulphide and certain other fumes ordinarily emanating from drainage pipes and the like, and is furthermore injurious to health because, in time, it comes off the walls in the form of dust and enters the lungs. These disadvantages more than balanced the spreading capacity and covering power that make white lead pigment desirable.

In an effort to avoid the poisonous and changeable qualities of white lead paints, zinc white or zinc oxide has been resorted to. While zinc white is permanent in air and is non-poisonous, it does not possess the spreading capacity and covering power of white lead and does not form a very intimate union with the oil (or vehicle) so that after the oil has dried the particles of the pigment tend to separate therefrom leaving a rough, broken surface. Zinc sulphide, also resorted to as a substitute for lead white, though forming a tolerably good pigment when a little barium sulphate is added (to form what is commonly known as lithopone) tends to take up oxygen from the air and in time turns into zinc sulphate which tends to wash out leaving a loose porous surface coating.

It is the object of my invention to produce a white pigment which in addition to being non-poisonous, will also be permanent in air, will have a great spreading and covering capacity and one which will form an intimate union with the oil or vehicle to produce a smooth and even coating.

To the above ends, my invention consists in preparing a novel pigment with zinc white or zinc oxide as a body, certain other ingredients being added to impart thereto a great spreading and covering capacity and to effect a more intimate union of the same with the vehicle, thus overcoming the principal disadvantages that have heretofore attended the use of zinc oxide as a pigment.

My invention further consists in the novel method of preparing the novel pigment of my invention as will be hereinafter described.

In carrying out my invention, I employ zinc white, sulphur, sodium carbonate, sodium chloride and ultramarine blue, and I preferably add a little quantity of barium sulphate. These ingredients are mixed together in suitable proportions and heated in a closed retort of some chemically inactive material, such as porcelain or the like, said mixture being stirred or agitated from time to time. After the ingredients have been heated for a sufficient length of time, the resulting powder is cooled, ground and mixed with a suitable vehicle such as oil, varnish or the like, and a suitable drier is added.

For the purpose of illustrating my invention I submit hereinbelow a table representing approximately the proportions and quantities of the ingredients used which is at present preferred by me since it will give in practice satisfactory results, although it is to be understood that the quantities of the various elements, compounds and mixtures of which my novel composition of matter consists may be varied and that my invention is not limited precisely to the formula herein given and described.

|  | By weight | Approximate weight |
|---|---|---|
|  | Per cent | Grams |
| Zinc oxide | 92.3 | 60 |
| Sulphur | 3.1 | 2 |
| Sodium carbonate | 2.3 | 1½ |
| Sodium chloride | 1.5 | 1 |
| Ultramarine blue | .8 | ½ |

These ingredients are thoroughly mixed and finely ground so that the particles of the different elements and compounds are thoroughly intermingled and in particular, the particles of ultramarine blue are thoroughly and uniformly distributed throughout the mixture. The mixture is then placed in a porcelain crucible or the like, and with the crucible closed, the mixture is heated until the mixture within the crucible attains a temperature of about 500 degrees centigrade, means being provided within the crucible suitably to stir or agitate the mixture from time to time while the same is being heated. The mixture is thus heated and stirred until all of the free sulphur in the mixture has disappeared, which by repeated experiments has been found to take from one hour to one hour and a half for the quantity above set forth. Of course when a greater quantity of the mixed ingredients is employed, the heating time will necessarily be prolonged.

The free sulphur employed serves to take up free oxygen from the air contained in the crucible and between the particles of the mixture, thus preventing the oxidation of the other ingredients and further serves to reduce the sodium carbonate to sodium polysulphide, which acting probably as a catalytic agent, serves to effect a finer division of the zinc oxide and to produce a more intimate and permanent union of the same with the oil, thereby greatly increasing its spreading and covering capacity.

During the heating process, some of the zinc oxide is reduced to zinc sulphide, and to counteract any possible tendency of the pigment ultimately produced to assume a yellowish tinge, and further to counteract any shade of color that might be imparted to the pigment by the vehicle with which it is to be mixed, a sufficient quantity of ultramarine blue is added, which, after being fused with the other ingredients, thoroughly and uniformly mixes with the same, thus producing a pure white, permanent pigment.

The sodium chloride added, while dehydrated during the fusing process, serves to increase the adhesiveness of the paint, that is, tends to produce a more intimate union of the paint with the surface on which it is spread, preventing any possibility of "peeling" off after the paint has dried.

To the above ingredients, before fusing, I prefer to add one gram of barium sulphate, which I have found improves in a general way the body of the paint thus produced and the spreading capacity of the same.

After these ingredients have been thoroughly mixed and heated as above set forth, with or without the addition of barium sulphate, the resulting mass is ground into a thick paste in some suitable vehicle, such as linseed oil, and is later liquefied to the desired consistency and a suitable drier such as japan or the like, is added.

The pigment produced according to the particular proportions above set forth, that is, 60 grams of zinc oxide, 1½ grams of sodium carbonate, 1 gram of sodium chloride, 2 grams of sulphur, and ½ gram of ultramarine blue (and preferably 1 gram of barium sulphate) is liquefied in about ten liquid ounces of vehicle, such as linseed oil, varnish or the like, to produce a paint having sufficient body and very desirable spreading and covering qualities so that but a single coating of this novel paint is needed for the proper painting of ordinary surfaces.

In actual practice, and as a result of repeated experiment, I have found my novel paint to possess a spreading and covering capacity about three or four times that of ordinary white lead paints, and I further found that my novel paint thoroughly withstands the atmospheric effects as well as exposure to other gases under the effect of which white lead generally turns black.

While for the purposes of producing this novel paint, I have employed the above ingredients in their pure commercial form, it is to be understood that in the manufacture of my novel paint on a large commercial scale, it is within the scope of my invention to resort to other practical commercial methods of preparing the different ingredients involved and in combining, mixing, fusing and grinding the same.

It will thus be seen that I have devised a novel composition of matter, which is adapted for use as a pigment for white paint, which in addition to possessing greater spreading and covering capacity than ordinary white paints known and used heretofore is not poisonous. I have further overcome the disadvantages heretofore attending the use of zinc oxide, by providing means to produce a finer division of the zinc oxide and to effect a more intimate union of the same with the vehicle, thereby assuring permanency of color as well as texture. It will also be seen that I have devised means for preventing the coating of paint from peeling off the surface on which it is spread.

If desired the white pigment of my invention may be manufactured and shipped in the dry powder form in varying quantities, to be mixed with the desired vehicle, in the desired quantity by the ultimate consumer.

Having thus described my invention, what I claim as new and desire to secure by Letters Patent is:

1. The method of preparing white pigment, consisting in mixing and grinding 60 grams of zinc oxide, 2 grams of sulphur, 1½ grams of sodium carbonate, 1 gram of sodium chloride and ½ gram of ultramarine blue, heating the same in a closed, chemically inactive retort until all of the free sulphur has disappeared, stirring said mixture while it is being heated, cooling the product and grinding the same.

2. The method of preparing white paint, consisting in mixing and grinding 60 parts of zinc oxide, 2 grams of sulphur, 1½ grams of sodium carbonate, 1 gram of sodium chloride, 1 gram of barium sulphate and ½ gram of ultramarine blue, heating and stirring the same from time to time, grinding the resulting product and mixing it with a vehicle.

3. A composition matter, comprising substantially 92.3% of zinc oxide, 2.3% sodium carbonate, 3.1% sulphur, 1.5% sodium chloride and .8% of ultramarine blue, by weight, fused together and finely ground.

4. A white paint, comprising substantially 92.3% of zinc oxide, 2.3% sodium carbonate, 3.1% flowers of sulphur, 1.5% sodium chloride and .8% of ultramarine blue, by weight, fused, finely ground and mixed with a vehicle.

5. A white paint, comprising 60 parts of zinc oxide, 1½ parts of sodium carbonate, 2 parts of sulphur, 1 part of sodium chloride and ½ part of ultramarine blue, by weight, fused, finely ground and mixed with a vehicle and a drier.

6. A white paint, consisting of 60 parts of zinc oxide, 1½ parts of sodium carbonate, 2 parts of sulphur, 1 part of sodium chloride, ½ part of ultramarine blue, and one part of barium sulphate, fused, ground fine and mixed with a vehicle.

LIEBESKIND WILLIAMS.